Figures 1, 2, 3:
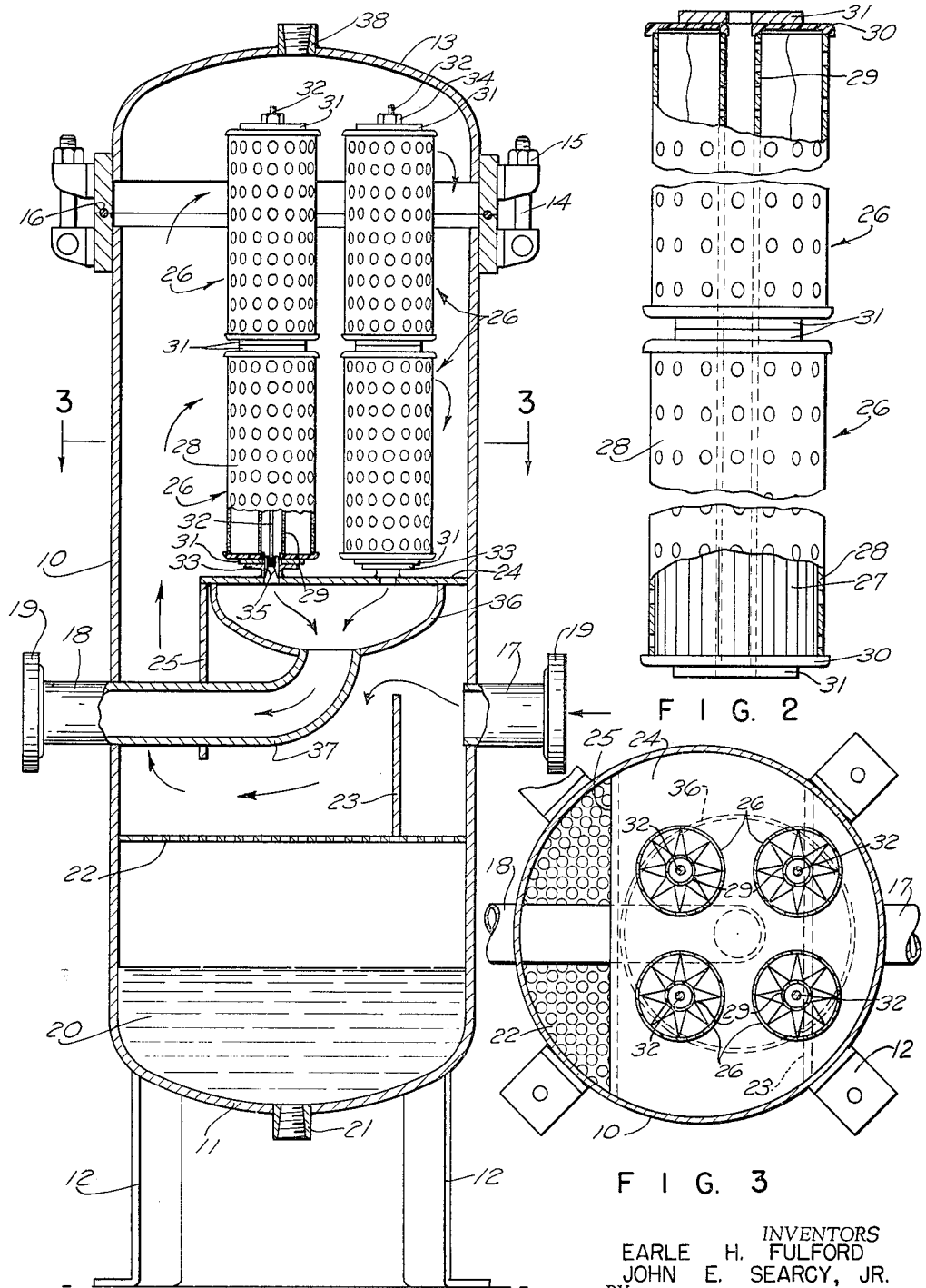

Aug. 24, 1965  E. H. FULFORD ETAL  3,201,924
GAS SEPARATOR/FILTER APPARATUS
Filed July 24, 1962

INVENTORS
EARLE H. FULFORD
JOHN E. SEARCY, JR.
BY
Charles E. Willson
ATTORNEY

United States Patent Office 3,201,924
Patented Aug. 24, 1965

3,201,924
GAS SEPARATOR/FILTER APPARATUS
Earle H. Fulford, Barrington, R.I., and John E. Searcy, Jr., Tulsa, Okla., assignors to Fram Corporation, Providence, R.I., a corporation of Rhode Island
Filed July 24, 1962, Ser. No. 212,104
2 Claims. (Cl. 55—324)

This invention relates to apparatus for removing entrained liquid droplets and particulates from a stream of gas.

The apparatus is well adapted to treat moisture-laden air to remove therefrom entrained water and oil and other contaminants, but it may be used to treat various gases to free them of liquid, or liquid and solid, contaminants.

The present apparatus is so constructed that the gaseous stream passed therethrough is freed from entrained liquid and solid contaminants by impingement, flow reversal, and hydrophobic porous media. To this end the gas is passed through a shell or container where it is subjected to a first-stage and second-stage treatment.

In the first stage the incoming gaseous stream is directed against a baffle that deflects the stream upwardly. The stream is then directed downwardly around the upper edge of the baffle, and this downwardly moving stream is directed upwardly again to form a loop. This causes the entrained liquid droplets and particulates, because of their greater mass and sudden obstruction, to fail to follow the upwardly curved path of the gaseous stream. This will cause a large portion of such contaminant to move downwardly out of the stream and fall through a perforated sump shield into a quiescent sump in the lower portion of the casing.

The partly cleaned and dried gas is then guided upwardly into the upper part of the casing for the second-stage treatment, where it is directed against a porous media that will pass the gas but block the remaining dirt and liquid particles. The clean and dry gas then flows through a discharge tube out of the casing.

The gas separator/filter apparatus above briefly described is capable of removing from a rapidly flowing gaseous stream all of the entrained liquid droplets and all solid particles down to a few microns in size, without causing a substantial pressure drop in the stream.

The apparatus of the present invention is well adapted to be connected to a conduit through which air or other gas is forced to free such gaseous stream of water, oil and solid particles.

The above and other features of the present invention will be further understood when read in connection with the accompanying drawing, wherein:

FIG. 1 is a vertical sectional view through a gas separator/filter apparatus constructed in accordance with the present invention.

FIG. 2 on a larger scale is a side view with part in section of two of the aligned separator/filter cartridges shown in FIG. 1; and FIG. 3 is a sectional view taken on the line 3—3 of FIG. 1.

Referring to the drawing the container or housing in which air or other gas is treated can be variously constructed, and as shown comprises an upstanding cylindrical vessel 10 having the closed lower end 11, and the vessel is shown as supported by the legs 12. This vessel has the removable cover 13 that is tightly secured in its closed position by the clamping bolts 14 and nuts 15, and a sealing gasket 16 is provided to form a tight seal between the upper end of the shell and removable cover.

The air or other gas to be treated is introduced into the shell 10 through the inlet pipe 17 and leaves through the discharge pipe 18. Such inlet and outlet pipes are shown as having the flange 19 adapted to be bolted to a conduit, not shown.

The lower portion of the shell 10 forms a sump 20 that receives the liquid and other contaminants removed from the gaseous stream, and the liquid and solid contaminants collected in such sump may be removed therefrom through the drain nipple 21 that is internally threaded and may be provided with a plug or valve, not shown. Above such sump is provided a perforated cover shield 22 through which the settling liquid, either water, oil, or a mixture of water and oil, and solid contaminants removed from the gaseous stream can pass into the quiescent sump. This perforated shield for the sump prevents any sloshing, bubbling or splashing of the liquid contaminants that collect in the sump, to thereby prevent such liquid from mixing with the gaseous stream from which it was removed and contaminating the same.

The air or other gas entering through the inlet 17 strikes against an upright baffle 23 which may be a perforated or a solid wall. Most of the incoming gaseous stream will be deflected upwardly as indicated by the arrows to pass around the upper end of this baffle. However, a small portion of this stream may pass downwardly through the apertures in the shield 22. Above the baffle 23 is provided a horizontally extending floor 24 that serves to direct the incoming gaseous stream downwardly about the upper edge of the baffle 23 as indicated by the arrows. This stream, after it leaves the baffle, curves upwardly near a side wall of the shell 10, as indicated by the arrows, to move upwardly between such side wall and a vertical wall 25 so that the stream forms a loop above the sump shield 22. This flow of the gaseous stream around the upper edge of the baffle 23 and then downwardly in a loop above the shield 22 causes the liquid and solid contaminants, because of their greater mass, to fail to make this sudden directional change and thus drop out of the stream onto and through the perforated shield 22 to pass downwardly into the sump 20.

The operation so far described completes what is regarded as the first-stage separating and dirt-removing operation effected in the apparatus of the present invention. The gaseous stream, from which a large portion of the liquid and solid contaminant has been removed, as a result of the operation just described, passes upwardly as indicated by the arrows into the upper portion of the shell 10 above the floor or platform 24 where it undergoes a second-stage treament. To this end there are mounted on the platform 24 a number of separator and filter cartridges each of which is indicated by the numeral 26. These cartridges, as shown in FIGS. 1 and 2, are disposed in pairs one above the other, and as will be seen from FIG. 3 four of these pairs of cartridges are provided as mounted upon and extending upwardly from the platform 24.

All of the cartridges 26 may be identical in construction and each preferably comprises a pleated paper filtering element 27 arranged in the form of a cylinder and confined between a perforated outer cylindrical wall 28 and a perforated inner cylindrical wall 29. The cartridge filter element 27 is closed at each end by an end disc 30 adhesively secured to the zigzag ends of the pleated filter element, and each of these end discs preferably has secured thereto a sealing gasket 31.

As will be apparent from the drawing, one cartridge 26 is placed on top of another to occupy the major portion of the shell height above the platform 24, and these pairs of aligned filter cartridges are secured in their operating position by clamping bolts 32. The lower end of each bolt is threaded or otherwise rigidly secured to the platform 24 by means of an adapter ring 33 having a central bridge bar that is threaded to receive such bolt. Each such ring is welded to the platform 24 over an opening therein. The upper end of each bolt 32 is provided with a clamping nut 34. Passages such as indicated by 35 are formed through the ring 33 at each side of its bridge bar so that the gas that has passed inwardly through the pleated porous material 27 and into the bore of the perforated center tube 29 can flow downwardly through such passages 35 to the space below the platform 24 and enter the dome-shaped chamber 36 below the platform 24. This chamber 36 has extending from the lower central portion thereof the outlet pipe 37 which terminates in the above mentioned pipe 18.

The cover 13 is shown as provided with an internally threaded nipple 38 that may be provided with a plug or valve, not shown. This nipple will serve to allow trapped air to be discharged from the shell or to permit a cleaning fluid to be introduced into the shell.

The primary purpose of the filter cartridges 26 above described is to block the remaining water or other liquid that is retained in the gas approaching these cartridges, while permitting the gas to pass through the pores of such pleated filter element 27 so that the air or other gas from which the remaining droplets are here removed and all solid particles down to a few microns in size will flow into the central passage 29 of the cartridge, and then into the chamber 36, as indicated by the arrows. The clean air or gas then passes into the pipe 37 and out of the shell 10 through the outlet pipe 18.

If the device of the present invention is being used to remove water from air, then the pleated filter element 27 such as porous paper is preferably treated with phenol formaldehyde to prevent the paper from becoming limp in the presence of moisture, and is also treated with silicone to repel such water. On the other hand, if the apparatus of the present invention is used to treat a gas containing oil, or water and oil, the pleated paper element is preferably treated with phenol formaldehyde as above described and with fluorocarbon to repel both oil and water while allowing the air or gas to pass through the filter cartridges.

The apparatus of the present invention may obviously be made as small or as large as desired, depending upon the volume of air or gas to be treated, and the arrangement and number of cartridges 26 used in the upper part of the shell may be varied extensively. By employing the two-stage treatment above described whereby a baffle and a reverse loop travel are employed to dislodge a large portion of the liquid and solid contaminants from the gaseous stream, and then a second-stage treatment is employed to pass the flowing gas but block the liquid and solid contaminant, a highly efficient device is provided. This apparatus may be connected in the conduit through which air or other gas is forced to free such gas of liquid or of liquid and solid contaminants, without causing a substantial drop in the pressure of the stream that is forced such apparatus.

Having thus described our invention, what we claim and desire to protect by Letters Patent is the following:

1. Apparatus adapted to be used with a conduit through which a gas flows under pressure for removal of a liquid contaminant from the gas stream, comprising an upstanding container with a liquid collecting sump at the bottom thereof, an inlet pipe for the gas extending through a side wall of the container above said sump, an outlet pipe for the gas extending through a wall of the container, an upright baffle in the container near said inlet for directing the entering gas stream upwardly, deflecting means above said baffle for redirecting the upwardly directed stream first downwardly about the baffle toward said sump and then upwardly again toward the upper portion of the container in a loop to dislodge liquid contaminant droplets downwardly out of the stream and into said sump, an upright filter cartridge in the upper portion of the container downstream of the baffle and of the deflecting means, said cartridge having liquid repellent porous media adapted to block the remaining liquid contaminant in the stream but pass the gas therethrough and downwardly toward said outlet pipe, and a chamber below said filter cartridge receiving gas passed downwardly and through said media and connected to said outlet pipe.

2. Apparatus adapted to be used with a conduit through which a gas flows under pressure for removal of water and other liquid contaminant from the gas stream, comprising an upstanding cylindrical vessel with a closed bottom, a liquid collecting sump in the lower portion of the vessel, a horizontal perforated covering shield in the vessel extending across said vessel above said sump to create a quiescent area, a horizontal inlet pipe for the gas extending through a side wall of the vessel above said shield, an outlet pipe for the gas extending through a wall of the vessel, an upright baffle in the vessel extending upwardly from said shield near said inlet with a top edge above the level of said inlet for directing the entering gas stream upwardly, a horizontally extending platform in said vessel above said inlet and spaced above said baffle top edge and having a vertical wall depending therefrom, spaced from a side of the vessel to constitute means redirecting the upwardly directed stream first downwardly about the baffle top edge toward said shield and then upwardly again through the space between said vertical wall and side of the vessel toward the upper portion of the vessel above said platform in a loop to dislodge liquid contaminant droplets downwardly out of the stream and through said perforated shield to enter and collect in said quiescent sump, an upright filter cartridge in the vessel mounted upon and extending upwardly from said platform, said cartridge having hydrophobic porous media adapted to block the remaining water and other liquid contaminant in the stream but pass the gas therethrough and downwardly through said platform, and a chamber below said platform receiving gas passed through said media and connected to said outlet pipe.

References Cited by the Examiner

UNITED STATES PATENTS

| | | | |
|---|---|---|---|
| 224,644 | 2/80 | Campbell et al. | 55—325 |
| 1,405,259 | 1/22 | Beach | 55—322 |
| 2,221,717 | 11/40 | Nicholson | 55—322 |
| 2,338,117 | 1/44 | Kermer | 55—186 |
| 2,824,622 | 2/58 | Buckman | 55—498 |
| 2,885,027 | 5/59 | Green | 55—326 |
| 3,010,537 | 11/61 | Baker et al. | 55—232 |

FOREIGN PATENTS

| | | |
|---|---|---|
| 594,641 | 3/60 | Canada. |
| 20,345 | 1909 | Great Britain. |
| 58,963 | 2/47 | Netherlands. |

HARRY B. THORNTON, *Primary Examiner.*